(12) United States Patent
Kaji et al.

(10) Patent No.: US 8,368,797 B2
(45) Date of Patent: Feb. 5, 2013

(54) VIEW FINDER

(75) Inventors: Eiji Kaji, Kanagawa (JP); Yuusuke Kanzaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 135 days.

(21) Appl. No.: 13/073,143

(22) Filed: Mar. 28, 2011

(65) Prior Publication Data

US 2011/0249167 A1    Oct. 13, 2011

(30) Foreign Application Priority Data

Apr. 9, 2010   (JP) ................................ P2010-090354

(51) Int. Cl.
  *H04N 5/222*   (2006.01)
  *G03B 13/02*   (2006.01)
(52) U.S. Cl. .................... 348/333.06; 348/375; 396/373
(58) Field of Classification Search ............ 348/333.06, 348/333.07, 373–376; 396/374, 422, 424, 396/482
  See application file for complete search history.

(56) References Cited

U.S. PATENT DOCUMENTS

| | | | | |
|---|---|---|---|---|
| 7,916,211 | B2 * | 3/2011 | Okudaira ..................... | 348/374 |
| 2006/0109364 | A1 * | 5/2006 | Sun ........................ | 348/333.06 |
| 2007/0040084 | A1 * | 2/2007 | Sturman et al. ........... | 248/280.11 |
| 2008/0049135 | A1 * | 2/2008 | Okudaira ................. | 348/333.06 |
| 2012/0195585 | A1 * | 8/2012 | Wagner ....................... | 396/428 |

FOREIGN PATENT DOCUMENTS

| | | |
|---|---|---|
| JP | 8-214194 | 8/1996 |
| JP | 2009-111944 | 5/2009 |

* cited by examiner

*Primary Examiner* — John Villecco
*Assistant Examiner* — Selam Gebriel
(74) *Attorney, Agent, or Firm* — Oblon, Spivak, McClelland, Maier & Neustadt, L.L.P.

(57) ABSTRACT

A view finder includes: a screen portion provided with a display screen which can display images captured by a camera main body; a mounting portion that can be fixed to the camera main body; and an arm portion connecting the mounting portion to the screen portion and moving the screen portion with respect to the mounting portion. The arm portion includes right and left arm portions respectively provided on right and left sides of the screen portion. The right arm portion includes first and second right arms rotatably formed with the screen portion and the mounting portion. The left arm portion includes first and second left arms rotatably formed with the screen portion and the mounting portion. The first and second right arms, the mounting portion and the screen portion, and the first and second left arms, the mounting portion and the screen portion form four-bar rotation link mechanism.

11 Claims, 8 Drawing Sheets

VIEW FINDER

BACKGROUND OF THE INVENTION

1. Field of the Invention

The present invention relates to a view finder capable of being installed in a camera main body which photographs subjects and records images thereof and of displaying images which are captured by the camera main body and information regarding each state of the camera main body and the like.

2. Description of the Related Art

JP-A-2009-111944 discloses a mechanism which can change an angle which a screen portion of a view finder faces.

In addition, JP-A-H8-214194 discloses a mechanism which can change an angle which a screen portion of a view finder of a video camera faces.

SUMMARY OF THE INVENTION

However, in the mechanisms disclosed in JP-A-2009-111944 and JP-A-H8-214194, if the position of the view finder is changed, there is a disadvantage in that the direction which the screen portion of the view finder faces is changed according to the position change of the screen portion of the view finder.

Thus, it is desirable to provide a view finder which can maintain a direction which a screen portion faces to be constant even if a position the screen portion of the view finder is changed.

According to an embodiment of the present invention, there is provided a view finder including a screen portion provided with a display screen which can display images captured by a camera main body; a mounting portion that can be fixed to the camera main body; and an arm portion that connects the mounting portion to the screen portion and moves the screen portion with respect to the mounting portion, wherein the arm portion includes a right arm portion provided in a right side of the screen portion; and a left arm portion provided in a left side of the screen portion, wherein the right arm portion includes a first right arm which is rotatably formed with the screen portion and is rotatably formed with the mounting portion; and a second right arm which is rotatably formed with the screen portion and is rotatably formed with the mounting portion, wherein the left arm portion includes a first left arm which is rotatably formed with the screen portion and is rotatably formed with the mounting portion; and a second left arm which is rotatably formed with the screen portion and is rotatably formed with the mounting portion, and wherein the first right arm, the second right arm, the mounting portion, and the screen portion form a four-bar rotation link mechanism, and the first left arm, the second left arm, the mounting portion, and the screen portion form a four-bar rotation link mechanism.

According to the embodiment of the present invention, it is possible to provide a view finder which can maintain a direction which a screen portion faces to be constant even if the screen portion of the view finder is changed.

DESCRIPTION OF THE PREFERRED EMBODIMENTS

Hereinafter, embodiments will be described.

The description will be made in the following order.

1. Description of link structure of view finder 1 according to embodiment

2. Description of maintaining structure for enabling screen portion 3 of view finder 1 according to embodiment to be maintained at constant position 3. Description of handles 37 and operation portions 39 provided in handles 37 according to embodiment <1. Description of Link Structure of View Finder 1 According to Embodiment>

Figure 1:
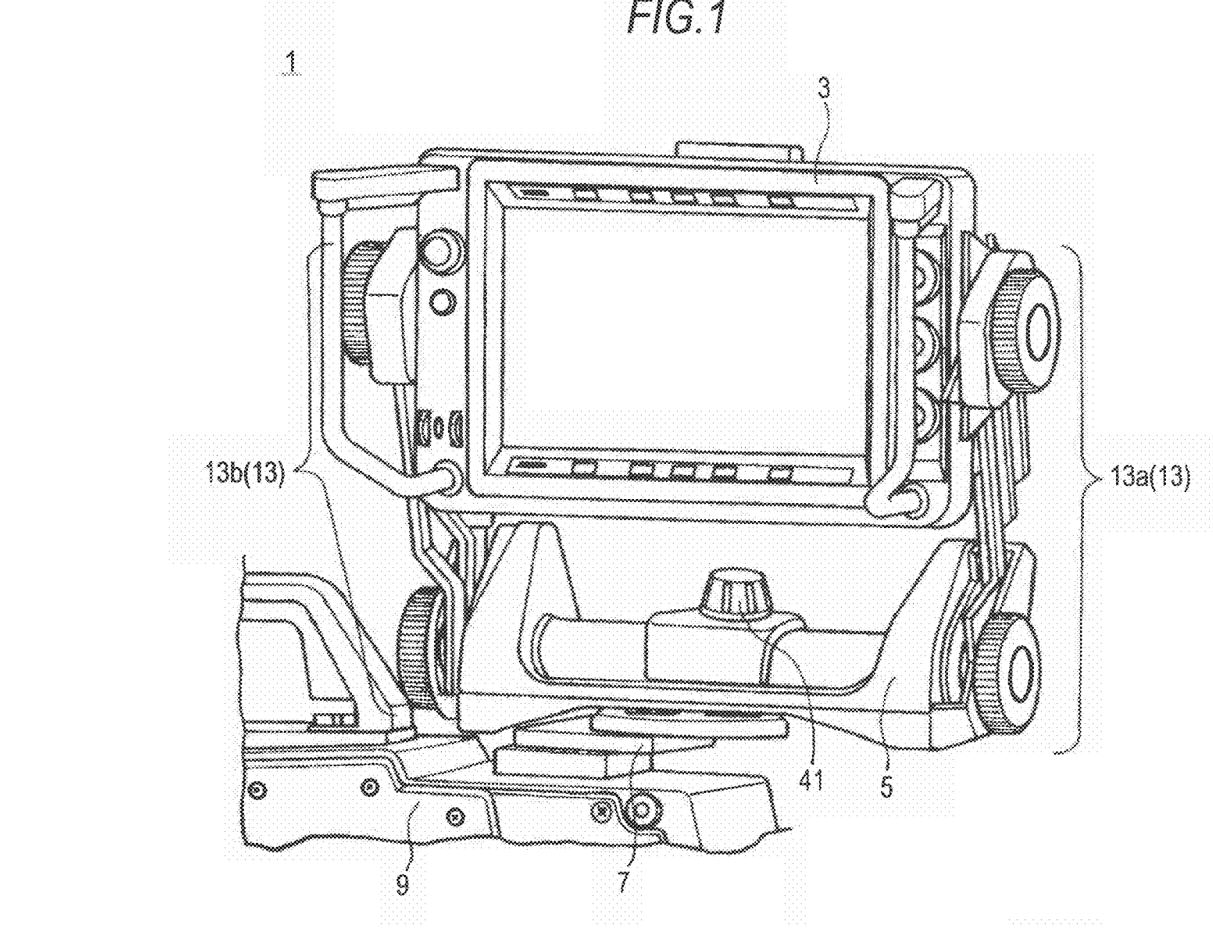
FIG. 1 is an exterior view of a view finder according to an embodiment.

FIG. 1 is an exterior view of a view finder 1 according to an embodiment of the present invention.

The view finder 1 is connected to a camera main body 9 via an adjuster portion 7.

Typically, the view finder 1 is connected to the camera main body 9 at an upper position, but may be connected to the camera main body 9 at a lateral side.

The camera main body 9 captures images, and outputs and records the captured images by performing various kinds of necessary electric processes on the captured images.

The camera main body 9 is fixed to a tripod stand so as to have constant height and to face a certain direction.

In this embodiment, the description is made assuming that a user adjusts a direction or the like of the camera main body 9 with the left hand and performs various kinds of adjustments for the camera main body 9 with the right hand; however, the role of the right hand and left hand may be variously changed.

The viewfinder 1 includes a screen portion 3, a mounting portion 5, the adjuster portion 7, and an arm portion 13.

Figure 2:
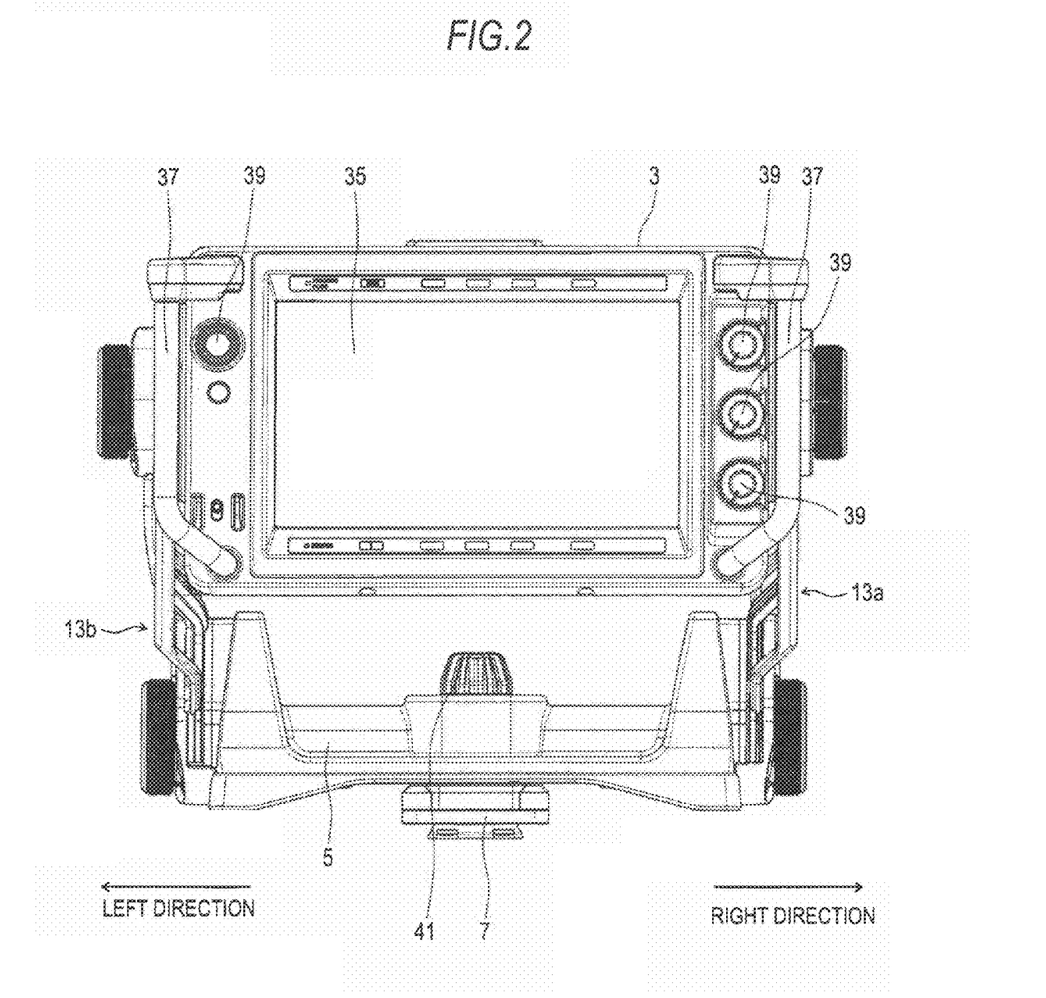
FIG. 2 is a front view of the view finder.

FIG. 2 is a front view of the view finder 1.

As shown in FIG. 2, a display screen 35 is provided in the screen portion 3, and the display screen 35 displays images which are captured by the camera main body 9, various kinds of states of the camera main body 9, settings for the camera main body 9, and the like.

A user (camera man) changes focus, angle, color, zoom, brightness, and the like by referring to the display screen 35.

The user may change a position, a direction, or the like of the camera main body 9, or may change processes performed inside the camera main body 9.

Since the user performs various kinds of operations while referring to the display screen 35, to enable the user to view the display screen 35 at all times is very important from the viewpoint of operability.

Particularly, when the position or the angle of the camera main body 9 is changed, it is necessary to confirm the display screen 35 in order to ascertain the changing to be appropriate during the changing of the position of the camera main body 9.

Further, in that case, since there are many cases where it is necessary to change focus, exposure, and the like of the camera main body 9 after the changing of the position or the angle of the camera main body 9, the user may not afford to change an angle of the screen portion 3.

However, in some cases, it is necessary to change the angle of the screen portion 3 when the angle and position of the camera main body 9 are changed.

Therefore, in this embodiment, the view finder 1 is configured such that the position of the screen portion 3 can be easily changed and the screen portion 3 does not face an unsuitable direction during the changing.

Hereinafter, description thereof will be made in detail. The configuration where the position of the screen portion 3 can be easily changed with respect to the camera main body 9 and the screen portion 3 is maintained to face a constant direction is realized particularly by the arm portion 13.

The arm portion 13 includes, as shown in FIG. 2, a right arm portion 13a and a left arm portion 13b.

The right arm portion 13a and the left arm portion 13b fundamentally have the same functions and structures.

Here, the reason why the term "fundamentally" is mentioned is that a first right rotation handle 31a and a first left rotation handle 31b have the same exterior but have different functions from one another. Likewise, a second right rotation handle 33a and the second left rotation handle 33b have the same exterior but have different functions.

Detailed structures of the right arm portion 13a and the left arm portion 13b will be described later with reference to FIGS. 3 and 4.

The screen portion 3 has an approximately rectangular shape.

Further, the display screen 35 is provided in the center of one surface.

A plurality of operation portions 39 are provided in the right and the left sides of the display screen 35.

A user can change situations displayed on the display screen 35 by operating the operation portions 39. In addition, the user may operate the camera main body 9 by operating the operation portions 39. Further, the user may change image processes in the camera main body 9 by operating the operation portions 39.

Handles 37 are provided in the side where the display screen 35 of the screen portion 3 is provided. The user changes the position and angle of the screen portion 3 by grasping the handles 37 or the like.

In addition, the user can change the position and angle of the screen portion 3 through the handles 37 and thus can change the position of the screen portion 3 through the first right rotation handle 31a described later and can change the angle of the screen portion 3 through the second right rotation handle 33a described later.

In FIG. 2, the handles 37 include a right handle 37a disposed in the right side of the display screen 35 and a left handle 37b disposed in the left side of the display screen 35.

The right handle 37a and the left handle 37b are longitudinal type handles. In addition, detailed configurations of the right handle 37a and the left handle 37b will be described with reference to FIG. 8.

The mounting portion 5 is connected to the adjuster portion 7 and is also connected to the right arm portion 13a and the left arm portion 13b.

The adjuster portion 7 can change an angle which the mounting portion 5 faces and a position of the mounting portion 5.

A rotative force adjusting portion 41 is disposed at an upper position around the center of the mounting portion 5. The rotative force adjusting portion 41 has a function of adjusting a force for maintaining an angle which the arm portion 13 faces. The rotative force adjusting portion 41 will be described in detail with reference to FIGS. 6 and 7.

Here, as shown in FIG. 2, the direction of the left side of the screen portion 3 is referred to as a left direction, and the direction of the right side of the screen portion 3 is referred to as a right direction.

Figure 3:
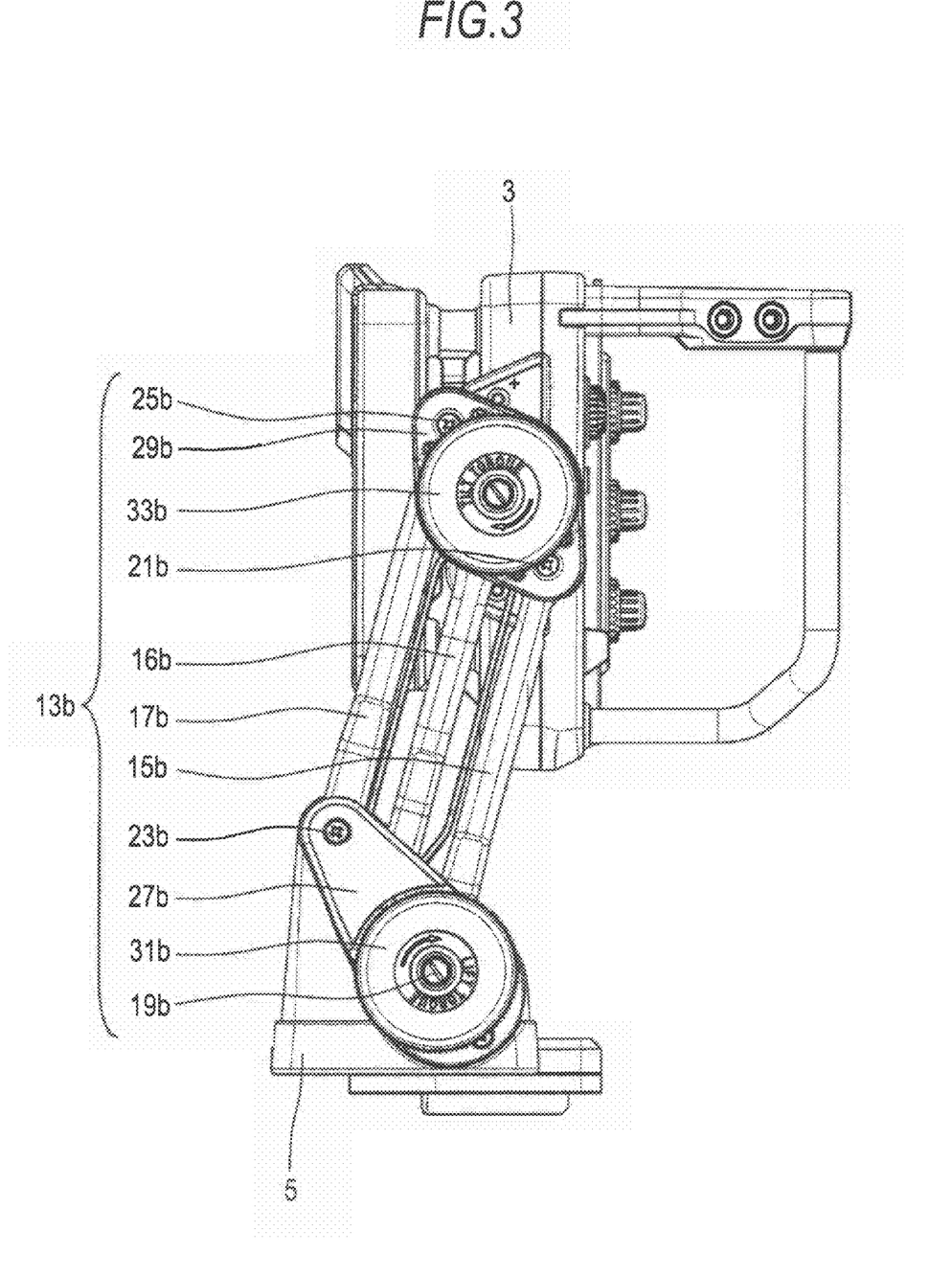
FIG. 3 is a left side view of the view finder.

FIG. 3 is a left side view of the view finder 1.

Figure 4:
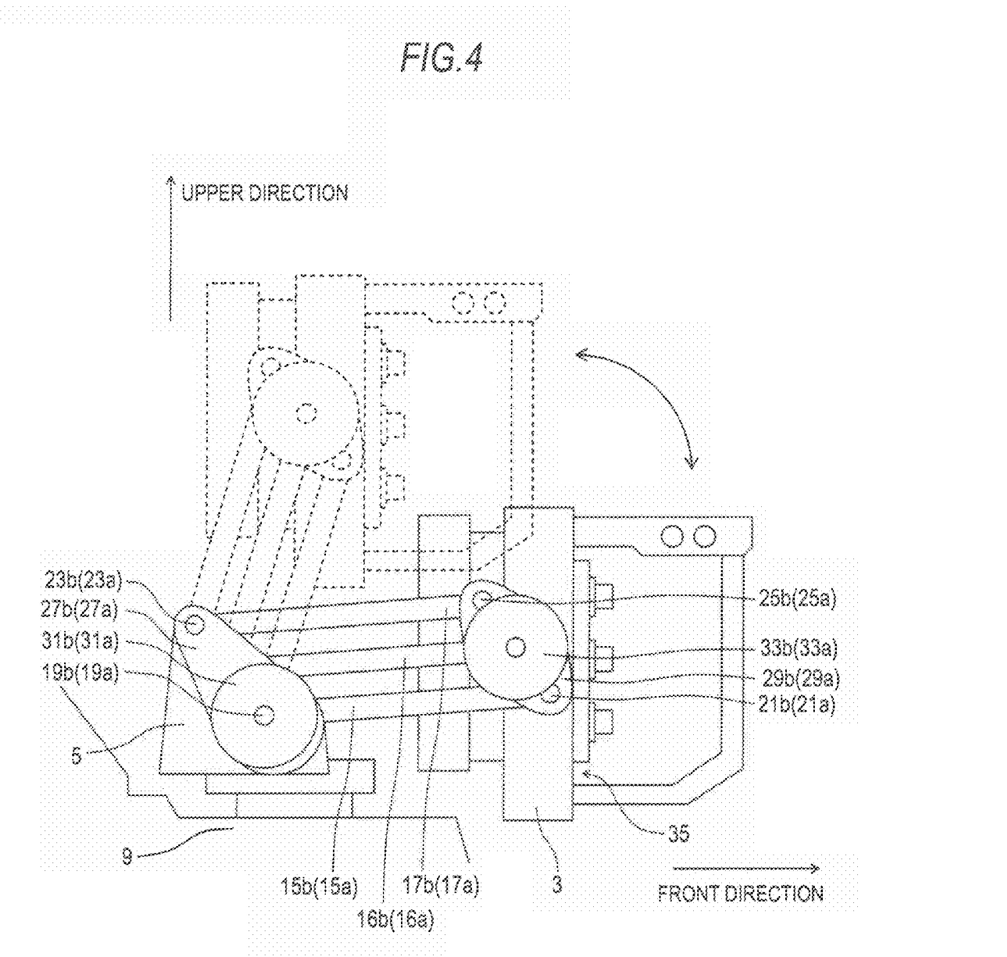
FIG. 4 is a diagram illustrating an arm portion of the view finder.

FIG. 4 is a diagram illustrating the arm portion 13 of the view finder 1.

As shown in FIG. 3, the arm portion 13b of the viewfinder 1 has a four-bar link mechanism (refer to FIG. 4).

A first left supporting portion 27b is connected to the mounting portion 5 (regarding the shape thereof or the like, refer to FIG. 1).

In the arm portion 13, the right arm portion 13a and the left arm portion 13b fundamentally have the same structure, and thus contents describing the structure of the left arm portion 13b are true of the right arm portion 13a unless particularly described.

The first left rotation handle 31b is provided in the left direction side of the first left supporting portion 27b (regarding the directions, refer to FIG. 2).

In addition, a first left rotation central axis 19b is disposed in a rotation central axis of the first left rotation handle 31b.

A first left arm 15b rotates with respect to the first left rotation central axis 19b.

A second left rotation central axis 23b is provided in the first left supporting portion 27b, and a second left arm 17b rotates with respect to the second left rotation central axis 23b.

Here, the first left rotation handle 31b has a role in adjusting a magnitude of friction adjusting a minimal force which is necessary to rotate the first left arm 15b.

That is to say, if the first left rotation handle 31b rotates, for example, rightwards, the friction increases and a force necessary to change an angle of the first left arm 15b also increases.

In contrast, if the first left rotation handle 31b rotates, for example, leftwards, the friction decreases and a force necessary to change an angle of the first left arm 15b also decreases.

Mechanisms for generating the friction may use various methods. For example, the friction may be generated through such effects as those of a drum brake by forcefully pressing the first left arm 15b towards the first left supporting portion 27b. Further, the friction may be generated through such effects as those of a drum brake by forcefully pressing the first left arm 15b towards the mounting portion 5.

On the other hand, the first right rotation handle 31a opposite to the first left rotation handle 31b has a function different from the first left rotation handle 31b.

Specifically, the first right rotation handle 31a is connected to a first right arm 15a, and if the first right rotation handle 31a rotates, the first right arm 15a also rotates according to the rotation thereof.

In other words, the first right rotation handle 31a enables the first right arm 15a to rotate.

Figure 5:
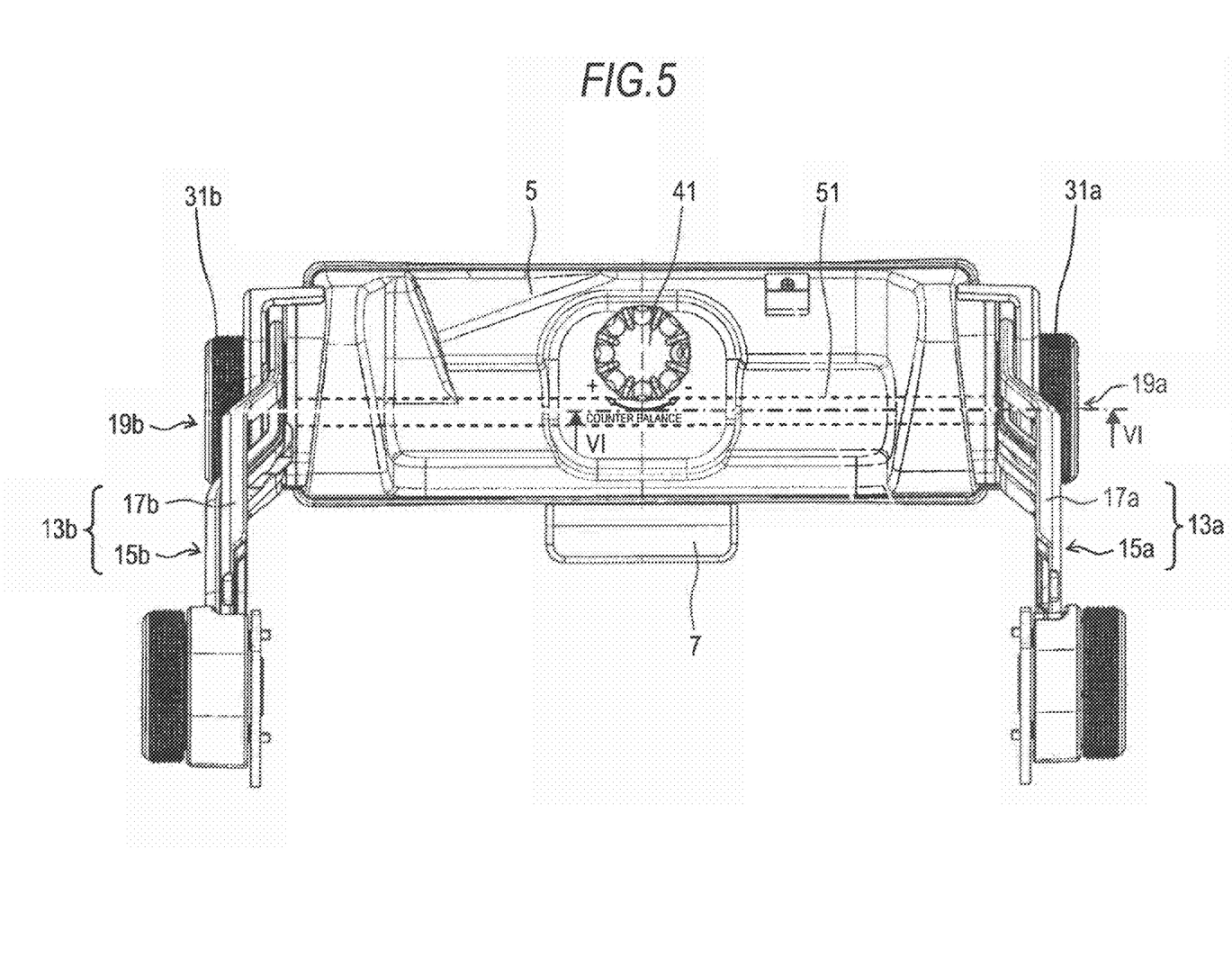
FIG. 5 is a plan view of a mounting portion and an arm portion in a state of removing a screen portion.

As described later, the first right arm 15a and the first left arm 15b are connected to each other via a connection axis 51, thus are integrally formed with each other, and thereby the first right arm 15a and the first left arm 15b form the same angle.

As a result, the first right rotation handle 31a adjusting the first right arm 15a also adjusts an angle of the first left arm 15b, and a position of the screen portion 3 is adjusted by moving the arm portion 13.

For the same reason, the first left rotation handle 31b which adjusts the friction which is a minimal force necessary to rotate the first left arm 15b adjusts a minimal force necessary to move the screen portion 3 through the movement of the arm portion 13.

A second left rotation central axis 23b is positioned in a direction opposite to the camera main body 9 side (hereinafter, referred to as an upper direction) when seen from the first left rotation central axis 19b. In addition, the first left rotation central axis 19b is positioned in the horizontal direction where the screen portion 3 can be moved (hereinafter, referred to as a front direction) when seen from the second left rotation central axis 23b.

The first left arm 15b which can rotate with respect to the first left rotation central axis 19b is rotatably connected to a second left supporting portion 29b in a third left rotation central axis 21b.

In the same manner, the second left arm 17b which can rotate with respect to the second left rotation central axis 23b is rotatably connected to the second left supporting portion 29b in a fourth left rotation central axis 25b.

Here, the first left arm 15b and the second left arm 17b have the same length. In addition, a distance between the first left rotation central axis 19b and the second left rotation central axis 23b is the same as a distance between the third left rotation central axis 21b and the fourth left rotation central axis 25b.

Due to this link structure, as shown in FIG. 4, an angle of the second left supporting portion 29b is not changed even if a position of the second left supporting portion 29b is changed due to changing of an angle of the left arm portion 13b and the right arm portion 13a.

In other words, even if the position of the screen portion 3 is changed (that is, even if the angle of the arm portion 13 is changed), the direction which the display screen 35 of the screen portion 3 faces is not changed.

Since the direction which the display screen 35 of the screen portion 3 faces is not changed even if the position of the screen portion 3 is changed, even in a case where the user moves the screen portion 3, the user can continue to view the display screen 35 without performing a particular operation.

In addition, the length of the first left arm 15b and the second left arm 17b is about half the distance between the first left rotation central axis 19b and the second left rotation central axis 23b or the distance between the third left rotation central axis 21b and the fourth left rotation central axis 25b.

Also, in this embodiment, the relationship of the length of the first left arm 15b and the second left arm 17b may be altered. Likewise, the relationship of the distance between the first left rotation central axis 19b and the second left rotation central axis 23b and the distance between the third left rotation central axis 21b and the fourth left rotation central axis 25b may be altered.

For example, the length of the first left arm 15b may be larger than that of the second left arm 17b.

If configured in this way, by moving the screen portion 3 from the position in the upper direction (the state marked with the dotted lines in FIG. 4) to the position in the front direction (the state marked with the solid lines in FIG. 4), it is possible to change the direction which the display screen 35 of the screen portion 3.

In other words, if this embodiment is grasped as the primary conception, when the position of the screen portion 3 is changed, a direction which is easy for a user to use is a direction which the display screen 35 of the screen portion 3 faces. As methods for this, it is possible to select various link mechanisms (for example, a method of adjusting the length of each link, or the like).

The link structure of the arm portion 13 is only an example, and can be modified as necessary.

The second left rotation handle 33b is rotatably provided in the second left supporting portion 29b.

The second left rotation handle 33b has a role in adjusting a magnitude of friction adjusting a minimal force which is necessary to rotate the screen portion 3.

In other words, if the second left rotation handle 33b rotates rightwards, the friction increases and a force which is necessary to rotate the screen portion 3 increases.

In contrast, if the second left rotation handle 33b rotates leftwards, the friction decreases and a force which is necessary to rotate the screen portion 3 also decreases.

On the other hand, the second right rotation handle 33a opposite to the second left rotation handle 33b has a function different from the second left rotation handle 33b.

Specifically, the second right rotation handle 33a is connected to the screen portion 3 so as to rotate the screen portion 3, and the display screen 35 of the screen portion 3 can be changed by rotating the second right rotation handle 33a.

In other words, the second right rotation handle 33a can change the direction of the screen portion 3.

In addition, mechanisms for generating the friction using the second left rotation handle 33b may use various methods. For example, the friction may be generated through such effects as those of a drum brake.

Due to this configuration, the user can easily change a position of screen portion 3 or a direction which the display screen 35 faces.

In addition, a left wiring arm 16b is disposed between the first left arm 15b and the second left arm 17b.

The left wiring arm 16b may be used to dispose cables for transmitting power from the camera main body 9 to the screen portion 3 and transmitting and receiving image information.

<2. Description of Maintaining Structure for Enabling Screen Portion 3 of View Finder 1 According to Embodiment to be Maintained at Constant Position>

As described above, the first right arm 15a is rotated by the first right rotation handle 31a.

The friction which is a minimal force necessary for the rotation is set by the first left rotation handle 31b.

However, in a case where there is no countermeasure, if the screen portion 3 is to be moved to the position in the upper direction from the position in the front direction as marked by the solid lines in FIG. 4, it is necessary for the weight arrangement of the screen portion 3 and the arm portion 13 to have a force resisting the friction.

Such a great force is necessary to change the position of the screen portion 3 (that is, the angle of the right arm portion 13a and the left arm portion 13b), and this is a problem in that the user is overburdened.

In addition, in many cases, since the user changes a position of the camera main body 9 when the user wants to move the screen portion 3, it is inconvenient for the user to exert the great force.

In addition, in the case where there is no countermeasure, for example, even if the screen portion 3 is moved to a position desired by the user, the position is difficult to maintain after the screen portion 3 is moved.

As a method of moving the screen portion 3 to a position desired by the user, if the friction is increased by rotating the first left rotation handle 31b leftwards, it is possible to maintain the position of the screen portion 3 by overcoming a force for the screen portion 3 and the arm portion 13 to be moved in the front direction. However, in terms of this method, since a great force is necessary when the screen portion 3 is moved in the upper direction, it is unsuitable.

As another method, there may be a method in which when the screen portion 3 is moved, first, the friction is reduced by rotating and moving the first left rotation handle 31b rightwards, and, after the movement, the friction is increased by rotating the first left rotation handle 31b rightwards. However, in this method, since the screen portion 3 can not be moved without the user using both hands, it is unsuitable in the same manner.

Therefore, in order to solve the above-described problems, by using the following method, it is possible to easily move the screen portion 3 and maintain a position after being moved.

FIG. 5 is a plan view of the mounting portion 5 and the arm portion 13 when the screen portion 3 is removed.

As shown in FIG. 5, the first right rotation central axis 19a of the first right rotation handle 31a and the first left rotation central axis 19b of the first left rotation handle 31b are connected to each other via a connection axis 51.

The rotative force adjusting portion 41 is provided in the central position and the upper position of the mounting portion 5.

The rotative force adjusting portion 41 generates the rotative force which rotates the right arm portion 13a and the left arm portion 13b upwards and adjusts the rotative force.

Figure 6:
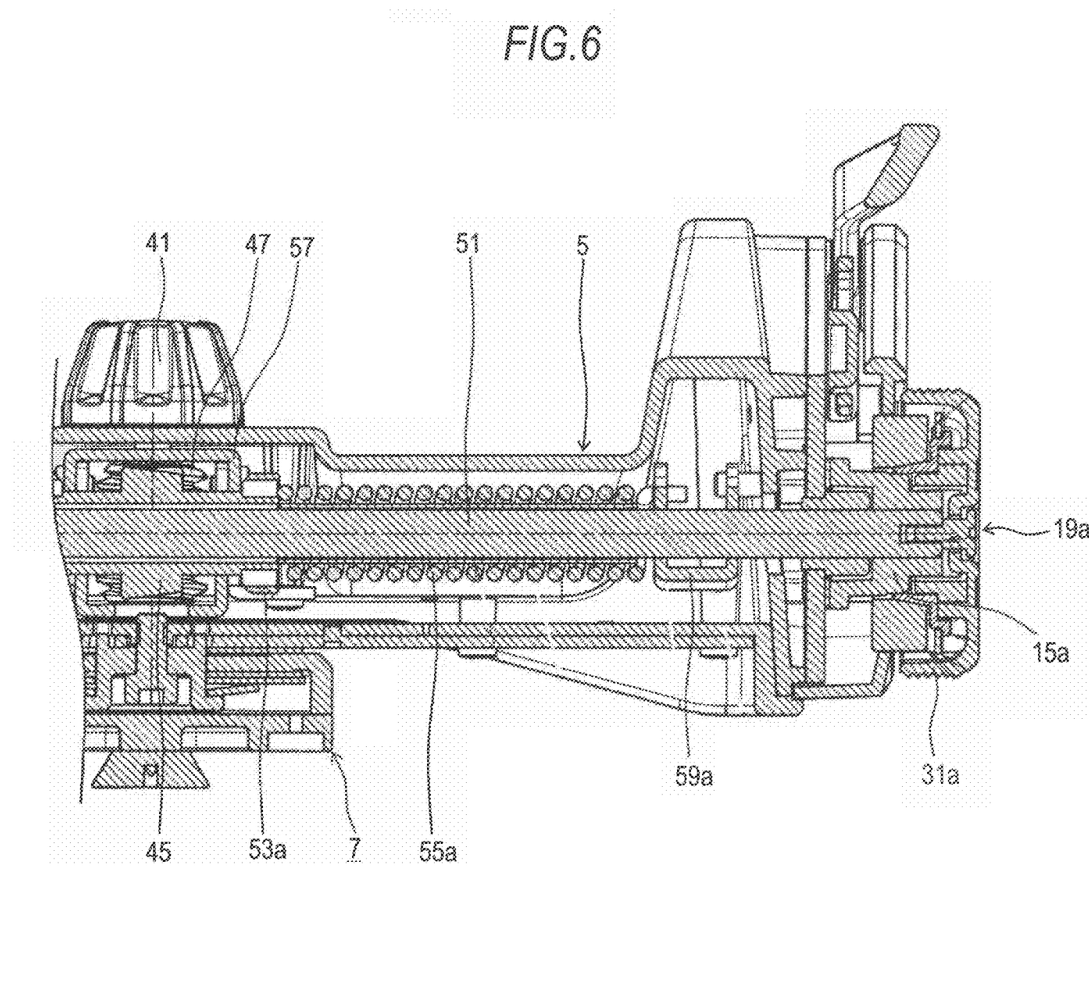
FIG. 6 is a cross-sectional view taken along the line VI-VI in FIG. 5.

FIG. 6 is a cross-sectional view taken along the line VI-VI in FIG. 5.

Figure 7:
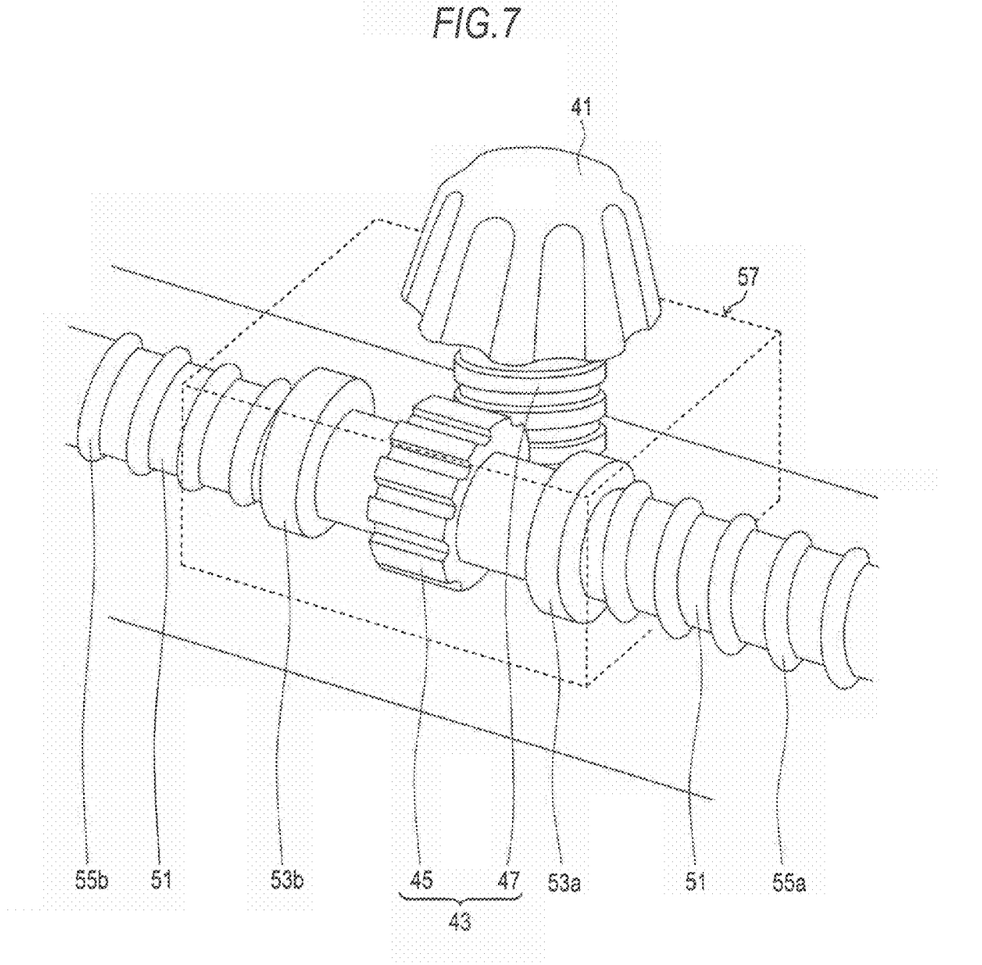
FIG. 7 is a diagram illustrating structures of a rotative force adjusting portion, a worm gear, and a coil spring.

FIG. 7 is a diagram illustrating a structure of the rotative force adjusting portion 41, a worm gear 43, and a coil spring 55.

As shown in FIGS. 6 and 7, the first right arm 15a is coupled to the connection axis 51 with a screw, a keyway, or the like, and the first right arm 15a and the connection axis 51 integrally rotate with respect to the first right rotation central axis 19a.

In addition, a right stopper 59a is provided in the inside further than the first right arm 15a. The right stopper 59a is provided to surround the connection axis 51 and is coupled to the connection axis 51 with a screw, a keyway, or the like.

Therefore, the connection axis 51 and the right stopper 59a integrally rotate. Further, since the connection axis 51 is formed with the first right arm 15a as a single body, the right stopper 59a, the connection axis 51, and the first right arm 15a integrally rotate.

The rotative force adjusting portion 41 is provided in the central portion of the mounting portion 5, and a gear box 57 is disposed inside the camera main body 9 side of the rotative force adjusting portion 41.

The gear box 57 contains a worm gear 43. The worm gear 43 inside the gear box 57 includes a worm 47 and a worm hole 45.

The rotative force adjusting portion 41 is coupled to the worm 47, and thus if the rotative force adjusting portion 41 rotates, the worm 47 integrally rotates with the rotative force adjusting portion 41.

Due to the rotation of the worm 47, the worm hole 45 concentrically rotates with the connection axis 51.

If the rotative force adjusting portion 41 rotates rightwards, the worm 47 rotates rightwards together, and the worm hole 45 rotates rightwards when seen from the first right rotation handle 31a.

In contrast, if the rotative force adjusting portion 41 rotates leftwards, the worm 47 rotates leftwards together, and the worm hole 45 rotates rightwards when seen from the first right rotation handle 31a.

That is to say, the worm hole 45 is coupled to a right connection member 53a and a left connection member 53b (refer to FIG. 7). In other words, the right connection member 53a and the left connection member 53b integrally rotate with the worm hole 45.

As a result, if the rotative force adjusting portion 41 rotates rightwards, the right connection member 53a rotates when seen from the first right rotation handle 31a.

In contrast, if the rotative force adjusting portion 41 rotates leftwards, the right connection member 53a rotates leftwards when seen from the first right rotation handle 31a.

In addition, the worm hole 45 and the right connection member 53a are formed of through-holes of a loophole structure, and the connection axis 51 penetrates the insides of the through-holes with the gap.

In this way, since the connection axis 51 penetrates the insides of through-holes with the gap, the connection axis 51, the wormhole 45, and the right connection member 53a can rotate independently from each other. The right connection member 53a is connected to the right stopper 59a via the right coil spring 55a.

However, the right coil spring 55a is bent in a twisted direction, and thus the right connection member 53a and the right stopper 59a do not integrally rotate.

The right coil spring 55a is wound in multiple turns (about eighteen) in a helical shape so as to proceed towards the first right rotation handle 31a with each turn rightwards (in addition, the left coil spring 55b is wound reversely thereto in multiple times).

Here, since the right coil spring 55a is wound multiple times, the spring constant is relatively small, and a force necessary to twist the right coil spring 55a in resistance to the spring force of the right coil spring 55a is formed to be relatively small.

Conversely, this means that if a constant rotative force occurs by one twist, even if the decrease in the twisting amount to a degree causes the rotative force to be decreased to a degree, the rotative force itself continues to occur.

By using this, the arm portion 13 (the right arm portion 13a and the left arm portion 13b) can be continuously applied with the rotative force.

In addition, the right coil spring 55a and the connection axis 51 are concentrically formed with a gap. By this, the state of the right coil spring 55a has no direct effect on the connection axis 51. Here, the reason why the term "direct" is mentioned is that the twisting force occurring in the right coil spring 55a has an indirect effect on the connection axis 51 via the right stopper 59a.

In addition, as shown in FIG. 7, the structures of the right connection member 53a, the right stopper 59a, and the right coil spring 55a are the same as those of the left connection member 53b, the left stopper 59b, and the left coil spring 55b, and they have a plane symmetry structure.

Since the view finder 1 has the above-described configuration, the user can move the screen portion 3 with smaller strength.

Specifically, if the user adjusts the rotative force adjusting portion 41, a force resisting the rotation of the screen portion 3 and the arm portion 13 in the front direction due to gravity occurs.

That is to say, the screen portion 3 and the arm portion 13 generate the force (moment) which enables the arm portion 13 to rotate in the front direction due to gravity.

Therefore, the user rotates the rotative force adjusting portion 41 rightwards so as to rotate the connection member 53 and the like (the worm hole 45, the right connection member 53a, and the left connection member 53b) rightwards when seen from the first right rotation handle 31a.

As a result, if the arm portion 13 does not rotate, twisting is generated between the right stopper 59a and the right connection member 53a, and the twisting causes the right coil spring 55a to generate a force which moves the arm portion 13 upwards.

Further, since the right coil spring 55a is wound in multiple times, the arm portion 13 is moved (rotated) upwards to a degree, but the right coil spring 55a can continue to generate the rotative force although the rotative force decreases to a degree.

Therefore, the user can easily change a position of the screen portion 3 using the rotative force adjusting portion 41.

In addition, the rotative force generated by the rotative force adjusting portion 41 does not exactly correspond with the rotative force resulting from the weight of the screen portion 3 and the arm portion 13. If this is unbalanced, the screen portion 3 does not stay at the position after being moved by the user. For this reason, the screen portion 3 stays at the position due to the friction generated by the first left rotation handle 31b.

As described above, due to the view finder 1 having the rotative force adjusting portion 41 and the first left rotation handle 31b, the view finder 1 can easily change the position of the screen portion 3 and maintain the changed position without a particular operation.

In other words, since the view finder 1 has the above-described configuration, the user does not perform a particular operation the first and last time the screen portion 3 is moved to a desired position, and great force is not necessary in the middle of the movement.

Therefore, the user can change a position of the screen portion 3 simply by moving the screen portion 3 to a desired position with one hand.

<3. Description of Handles 37 and Operation Portions 39 Provided in Handles 37 According to Embodiment>

In this embodiment, in order to improve the operability by a user, the handles 37 are of a longitudinal type, and the operation portions 39 are provided in the handles 37.

In this embodiment, since the screen portion 3 can be moved using the rotative force adjusting portion 41 with a small force, the handles 37 can be formed in a longitudinal type in this way.

Likewise, in this embodiment, since the screen portion 3 can be moved using the rotative force adjusting portion 41 with a small force, the operation portions 39 can be provided in the handles 37 in this way.

Hereinafter, the handles 37 and the operation portions 39 provided in the handles 37 according to an embodiment will be described.

As a mechanism for generating the rotative force in the arm portion 13, for example, a spring may be directly formed between the first right arm 15a and the first left arm 15b of the arm portion 13 and the mounting portion 5.

In addition, as a mechanism for generating the rotative force in the arm portion 13, a member such as a see-saw which generates a rotative force almost equal to the rotative force in the arm portion 13 may be formed at an opposite position.

Figure 8:
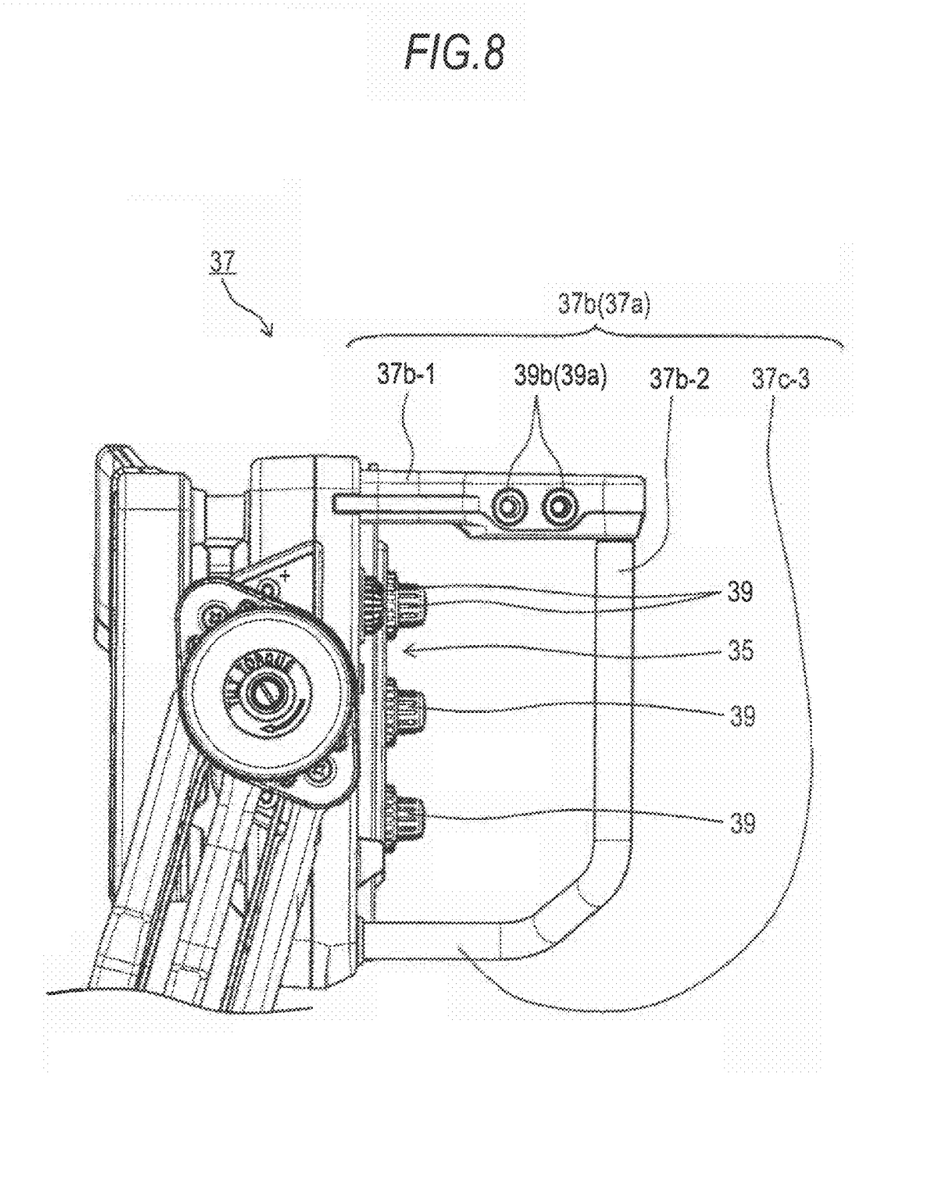
FIG. 8 is a diagram illustrating a handle.

FIG. 8 is a diagram illustrating the handle 37. As shown in FIG. 8, the left handle 37b includes a first left handle member 37b-1, a second handle member 37b-2, and a third handle member 37b-3.

The first left handle member 37b-1 has a rectangular bar shape which vertically extends in the outside direction of the display screen 35 from the left side and the upper position of the screen portion 3.

The second left handle member 37b-2 has a round bar shape which extends downwards from the end portion of the far side of the display screen 35 of the first left handle member 37b-1. In many cases, a user grasps the second handle member 37b-2 and changes a position of the screen portion 3 and an angle which the display screen 35 faces.

The third left handle member 37b-3 has a round bar shape which vertically extends in the outside direction of the display screen 35 from the left side and the lower position of the screen portion 3.

The third left handle member 37b-3 and the second left handle member 37b-2 are connected to each other by a member having the angle of about 135 degrees.

The left handle 37b has a longitudinal type handle shape. Due to such a longitudinal type handle shape, the user can more easily adjust an angle of the screen portion 3 than due to a transverse type handle shape.

In addition, as described above, due to the rotative force maintaining structure such as the rotative force adjusting portion 41, strength necessary to change a position of the screen portion 3 decreases, and thus this longitudinal type handle can be used.

In addition, two left operation portions 39b are provided on the left lateral surface of the first left handle member 37b-1 when seen from the outside of the display screen 35.

Contents or the like displayed on the display screen 35 can be changed using the left operation portion 39b. As necessary, a state of the camera main body 9 can be changed or the like.

In this way, since the left operation portion 39b is provided in the first left handle member 37b-1, the user can operate the left operation portion 39b while operating the screen portion 3.

In addition, the left operation portion 39b is provided in the first left handle member 37b-1, not in the second left handle member 37b-2.

Due to this, it is possible to prevent the user from mistakenly operating the left operation portion 39b while grasping the second left handle member 37b-2 and adjusting a position and an angle of the screen portion 3.

More preferably, the user arbitrarily can allocate necessary functions to the left operation portion 39b.

Due to this configuration, convenience of use for users further increases.

In addition, the configuration of the right handle 37a is in plane symmetry with the left handle 37b.

According to the above-described embodiment, the view finder 1 has the screen portion 3 provided with the display screen 35 which can display images captured by the camera main body 9.

In addition, the view finder 1 has the mounting portion 5 which can be fixed to the camera main body 9, and the arm portion 13 which connects the mounting portion 5 to the screen portion 3 and moves the screen portion 3 with respect to the mounting portion 5.

In addition, the arm portion 13 includes the right arm portion 13a which is provided in the right side of the screen portion 3 and the left arm portion 13b which is provided in the left side of the screen portion 3.

In addition, the right arm portion 13a includes the first right arm 15a which is rotatably formed with the screen portion 3 and is rotatably formed with the mounting portion 5, and the second right arm 17a which is rotatably formed with the screen portion 3 and is rotatably formed with the mounting portion 5.

In addition, the left arm portion 13b includes the first left arm 15b which is rotatably formed with the screen portion 3 and is rotatably formed with the mounting portion 5, and the second left arm 17b which is rotatably formed with the screen portion 3 and is rotatably formed with the mounting portion 5.

The first right arm 15a, the second right arm 17a, the mounting portion 5, and the screen portion 3 form the four-bar rotation link mechanism, and the first left arm 15b, the second left arm 17b, the mounting portion 5, and the screen portion 3 form the four-bar rotation link mechanism.

Due to the above-described configuration, even when a user moves the screen portion 3, the user can continue to view the display screen 35 without a further particular operation.

The first right rotation central axis 19a which enables the first right arm 15a and the mounting portion 5 to be rotatably connected to each other is positioned at the side where the mounting portion 5 is connected to the camera main body 9 when seen from the second right rotation central axis 23a which enables the second right arm 17a and the mounting portion 5 to be rotatably connected to each other.

In addition, the third right rotation central axis 21a which enables the first right arm 15a and the screen portion 3 to be rotatably connected to each other is positioned at the side where the mounting portion 5 is connected to the camera main body 9 when seen from the fourth right rotation central axis 25a which enables the second right arm 17a and the screen portion 3 to be rotatably connected to each other.

The first left rotation central axis 19b which enables the first left arm 15b and the mounting portion 5 to be rotatably connected to each other is positioned at the side where the mounting portion 5 is connected to the camera main body 9 when seen from the second left rotation central axis 23b which enables the second left arm 17b and the mounting portion 5 to be rotatably connected to each other.

In addition, the third left rotation central axis 21b which enables the first left arm 15b and the screen portion 3 to be rotatably connected to each other is positioned at the side where the mounting portion 5 is connected to the camera main body 9 when seen from the fourth left rotation central axis 25b which enables the second left arm 17b and the screen portion 3 to be rotatably connected to each other.

Due to the above-described configuration, even when a user moves the screen portion 3, the user can continue to view the display screen 35 without a further particular operation.

The distance between the first right rotation central axis 19a and the third right rotation central axis 21a is formed to be the same as the distance between the second right rotation central axis 23a and the fourth right rotation central axis 25a.

In addition, the distance between the first left rotation central axis 19b and the third left rotation central axis 21b is formed to be the same as the distance between the second left rotation central axis 23b and the fourth left rotation central axis 25b.

Due to the above-described configuration, even when a user moves the screen portion 3, the user can continue to view the display screen 35 without a further particular operation since a direction which the display screen 35 of the screen portion 3 faces is not changed.

The second right rotation handle 33a (screen angle adjusting portion) which changes an angle of the screen portion 3 is provided between the third right rotation central axis 21a and the fourth right rotation central axis 25a.

In addition, the first right rotation handle 31a (arm angle adjusting portion) which changes an elongated angle of the first right arm portion 13a and the left arm portion 13b is provided in the first right rotation central axis 19a.

Further, the second left rotation handle 33b (screen portion side friction adjusting portion) which adjusts a force necessary to change an angle of the screen portion 3 is provided between the third left rotation central axis 21b and the fourth left rotation central axis 25b.

In addition, the first left rotation handle 31b (mounting portion side friction adjusting portion) which adjusts a force necessary to change an elongated angle of the right arm portion 13a and the left arm portion 13b is provided in the first left rotation central axis 19b.

Due to this configuration, a user can easily change a position of the screen portion 3 or a direction which the display screen 35 faces.

The connection axis 51 is provided to be connected to the first right rotation central axis 19a and the first left rotation central axis 19b, and the connection axis 51 is fixed to the first right arm 15a and the first left arm 15b such that angles of the first right arm 15a and the first left arm 15b correspond with each other.

Due to this configuration, it is possible to correspond with the angles of the first right arm 13a and the first left arm 13b with a simple configuration.

When the right arm portion 13a and the left arm portion 13b rotate, the rotative force is applied to the rotation central axis in a direction where the screen portion 3 is spaced apart from the camera main body 9.

Due to this configuration, a user does not perform a particular operation at the first and last time when the screen portion 3 is moved to a desired position, and great force is not necessary in the middle of the movement.

There are provided the worm gear 43, the rotative force adjusting portion 41 which rotates the worm 47 of the worm gear 43, and the twisting coil spring 55 which has one end fixed to the connection axis 51 and is fixed to the worm hole 45 of the worm gear 43.

Due to this configuration, it is possible to generate the rotative force in the arm portion 13 with the simple configuration. In addition, it is possible to adjust the rotative force in the arm portion 13 with the simple configuration.

The twisting coil spring 55 is wound with respect to the connection axis 51 in a helical shape.

Due to this configuration, it is possible to generate the rotative force in the arm portion 13 with the simple configuration.

The right handle 37a which extends in the front direction of the display screen 35 is provided in the right side of the screen portion 3, and the left handle 37b which extends in the front direction of the display screen 35 is provided in the left side of the display portion 3.

Due to this configuration, a user can easily adjust an angle of the screen portion 3 as compared with a transverse type handle shape.

The right handle 37a is a longitudinal type handle of which one end is fixed at the upper position of the screen portion 3 and the other end is fixed at the lower position of the screen portion 3. The left handle 37b is a longitudinal type handle of which one end is fixed at the upper position of the screen portion 3 and the other end is fixed at the lower position of the screen portion 3.

Due to this configuration, a user can easily adjust an angle of the screen portion 3 as compared with a transverse type handle shape.

The right operation portion 39a is provided at the upper side position of the right handle 37a, and the left operation portion 39b is provided at the upper side position of the left handle 37b.

Due to this configuration, it is possible to operate the left operation portion 39b while operating the screen portion 3.

The first right rotation handle 31a is an example of the arm angle adjusting portion or a part thereof, and the first left rotation handle 31b is an example of the mounting portion friction adjusting portion or a part thereof.

In addition, the second right rotation handle 33a is an example of the screen angle adjusting portion or a part thereof, and the second left rotation handle 33b is an example of the screen portion side friction adjusting portion or a part thereof.

The term "the same" in the embodiment of the present invention includes a difference in a range of a degree generated by an error such as a manufacturing error.

The present invention is not limited to the above-described embodiment and may be implemented in various forms.

The view finder 1 is applicable to all electrical products having a camera function. The camera main body 9 may be a fixed camera, a portable camera, or the like.

The present application contains subject matter related to that disclosed in Japanese Priority Patent Application JP 2010-090354 filed in the Japan Patent Office on Apr. 9, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A view finder comprising:
    a screen portion provided with a display screen which can display images captured by a camera main body;
    a mounting portion that can be fixed to the camera main body; and
    an arm portion that connects the mounting portion to the screen portion and moves the screen portion with respect to the mounting portion,
    wherein the arm portion includes
        a right arm portion provided on a right side of the screen portion, and
        a left arm portion provided on a left side of the screen portion,
    the right arm portion includes
        a first right arm which is rotatably formed with the screen portion and is rotatably formed with the mounting portion, and
        a second right arm which is rotatably formed with the screen portion and is rotatably formed with the mounting portion,
    the left arm portion includes
        a first left arm which is rotatably formed with the screen portion and is rotatably formed with the mounting portion, and
        a second left arm which is rotatably formed with the screen portion and is rotatably formed with the mounting portion, and
    the first right arm, the second right arm, the mounting portion, and the screen portion form a four-bar rotation link mechanism, and the first left arm, the second left arm, the mounting portion, and the screen portion form a four-bar rotation link mechanism.

2. The view finder according to claim 1, wherein
    a first right rotation central axis which enables the first right arm and the mounting portion to be rotatably connected to each other is positioned at a side where the mounting portion is connected to the camera main body when seen from the second right rotation central axis which enables the second right arm and the mounting portion to be rotatably connected to each other,
    a third right rotation central axis which enables the first right arm and the screen portion to be rotatably connected to each other is positioned at the side where the mounting portion is connected to the camera main body when seen from a fourth right rotation central axis which enables the second right arm and the screen portion to be rotatably connected to each other,
    a first left rotation central axis which enables the first left arm and the mounting portion to be rotatably connected to each other is positioned at the side where the mounting portion is connected to the camera main body when seen from a second left rotation central axis which enables the second left arm and the mounting portion to be rotatably connected to each other, and
    a third left rotation central axis which enables the first left arm and the screen portion to be rotatably connected to each other is positioned at the side where the mounting portion is connected to the camera main body when seen from the fourth left rotation central axis which enables the second left arm and the screen portion to be rotatably connected to each other.

3. The view finder according to claim 2, wherein
    a distance between the first right rotation central axis and the third right rotation central axis is formed to be the same as a distance between the second right rotation central axis and the fourth right rotation central axis, and
    a distance between the first left rotation central axis and the third left rotation central axis is formed to be the same as the distance between the second left rotation central axis and the fourth left rotation central axis.

4. The view finder according to claim 3, wherein
    a screen angle adjusting portion which changes an angle of the screen portion is provided between the third right rotation central axis and the fourth right rotation central axis,
    an arm angle adjusting portion which changes an elongated angle of the right arm portion and the left arm portion is provided in the first right rotation central axis,
    a screen portion side friction adjusting portion which adjusts a force necessary to change an angle of the screen portion is provided between the third left rotation central axis and the fourth left rotation central axis, and
    a mounting portion side friction adjusting portion which adjusts a force necessary to change an elongated angle of the right arm portion and the left arm portion is provided in the first left rotation central axis.

5. The view finder according to any one of claims 2 to 4, wherein a connection axis is provided to be connected to the first right rotation central axis and the first left rotation central axis, and the connection axis is fixed to the first right arm and the first left arm such that angles of the first right arm and the first left arm correspond with each other.

6. The view finder according to claim 5, wherein a rotative force is applied to the rotation central axis in a direction where the screen portion is spaced apart from the camera main body when the right arm portion and the left arm portion rotate.

7. The view finder according to claim 6, further comprising:
    a worm gear;
    a rotative force adjusting portion which rotates a worm of the worm gear; and
    a twisting coil spring which has one end fixed to the connection axis and is fixed to a worm hole of the worm gear.

8. The view finder according to claim 7, wherein the twisting coil spring is wound with respect to the connection axis in a helical shape.

9. The view finder according to any one of claims 1 to 8, wherein a right handle which extends in a front direction of the display screen is provided in a right side of the screen portion, and a left handle which extends in the front direction of the display screen is provided in a left side of the display screen.

11. The view finder according to claim 9, wherein the right handle is a longitudinal type handle of which one end is fixed at an upper position of the screen portion and the other end is fixed at a lower position of the screen portion, and the left handle is a longitudinal type handle of which one end is fixed at the upper position of the screen portion and the other end is fixed at the lower position of the screen portion.

11. The view finder according to claim 10, wherein a right operation portion is provided at an upper side position of the right handle, and a left operation portion is provided at an upper side position of the left handle.

* * * * *